INVENTOR.
WILLIAM L. MCGRATH.
BY
ATTORNEY.

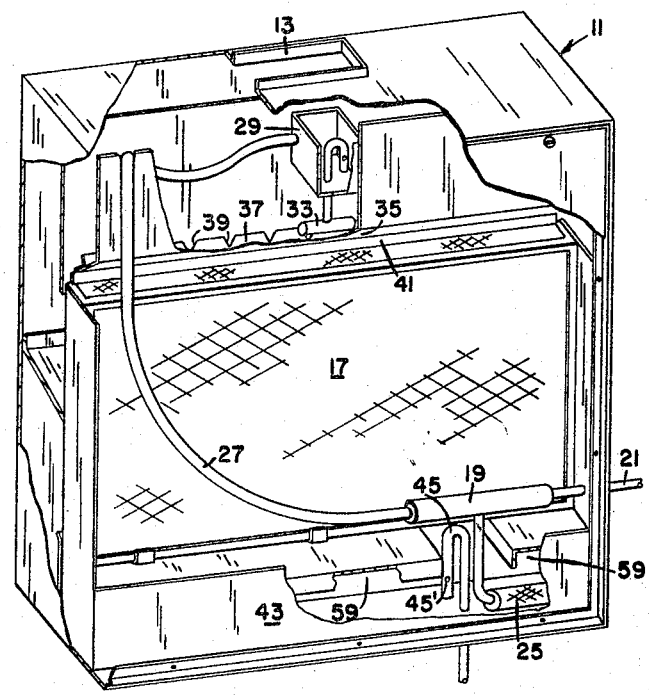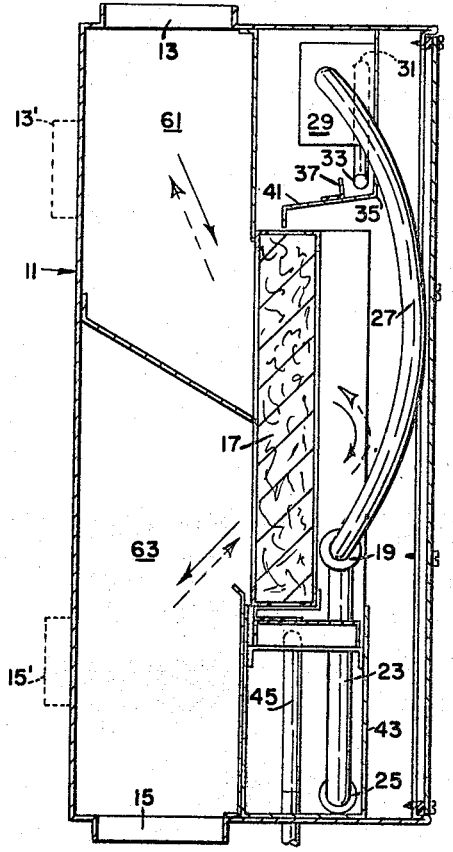

3,265,371
GAS AND LIQUID CONTACT APPARATUS
William L. McGrath, Syracuse, N.Y., assignor to Carrier Corporation, Syracuse, N.Y., a corporation of Delaware
Filed June 4, 1963, Ser. No. 285,351
1 Claim. (Cl. 261—27)

This invention relates generally to gas and liquid contact apparatus and more particularly to an improved humidifier for use with a furnace to humidify air heated by the furnace.

For residential or small buildings, it is desirable to furnish some means of adding a sufficient amount of moisture during the colder months in addition to the requirement for providing warm air to heat the enclosed area. One common practice, in most warm air furnaces, is to provide a pan of water within the heated air plenum of the furnace thereby adding moisture to the air by an evaporation process. To increase the amount of water capable of being evaporated, absorptive members and the like are often added to the pan and extend thereabove furnishing a larger surface area available for evaporation. It has also been proposed to atomize water directly into the air.

Various means have been devised to employ a gas and liquid contact surface to provide humidification. One method flows water over the surface which then goes to a drain, while a second uses a sump for housing water through which the surface is circulated. The latter arrangement generally has a makeup water supply but no blow-down system.

There are several disadvantages to the above described devices. In atomizing water, for example, the mineral content of the water remains in the air after evaporation, which makes tiny specks of dust for carry-over into the area to be conditioned and settles therein upon the furnishings, etc. The pan-type and circulating surface-type humidifiers reduce this dust problem but concentrates minerals to form heavy deposits that decrease efficiency thus requiring periodic maintenance to clean off these deposits. Flowing water over the surface requires excessive use of water; if the amount of water is reduced it will result in spotty wetting of the surface or there will be insufficient amount of water for evaporation.

It is therefore the primary object of this invention to obviate the above mentioned disadvantages by providing an improved humidifier having the desired humidification requirement without the usual accumulation of mineral scale.

Another object of this invention is to provide a humidifier employing a jet pump and a syphon device to obtain high instantaneous flow rates of water for distribution to the gas and liquid contact media for improved wetting and cleaning thereby increasing the capacity of a given surface.

A further object of this invention is to provide a humidifier employing a syphon device to periodically clean and blow-down the sump to prevent mineral concentration. Other objects of the invention will be readily perceived from the following description.

This invention relates to a gas and liquid contact apparatus having an evaporative media exposed to passage of gas and supplied with liquid by a pumping means feeding the liquid to a distribution means. A sump is provided to collect liquid not evaporated in the media and includes a syphon means for intermittently removing at least a portion of the liquid therefrom.

In another form this invention relates to a gas and liquid contact apparatus having an evaporative media exposed to passage of gas and supplied with liquid by pumping means feeding liquid to a distribution means which includes a syphon to intermittently supply liquid to said media and a sump to collect liquid not evaporated in said media.

A further form of this invention relates to a gas and liquid contact apparatus having an evaporative media exposed to passage of gas and supplied with liquid by an ejector pump employing makeup liquid to aspirate the liquid not evaporated by said media which is collected in a sump.

The attached drawing illustrates a preferred embodiment of the invention, in which:

FIGURE 1 is a perspective view of humidifier embodying the present invention;

FIGURE 2 is a view in elevation of the humidifier shown in FIGURE 1; and

Figure 3:
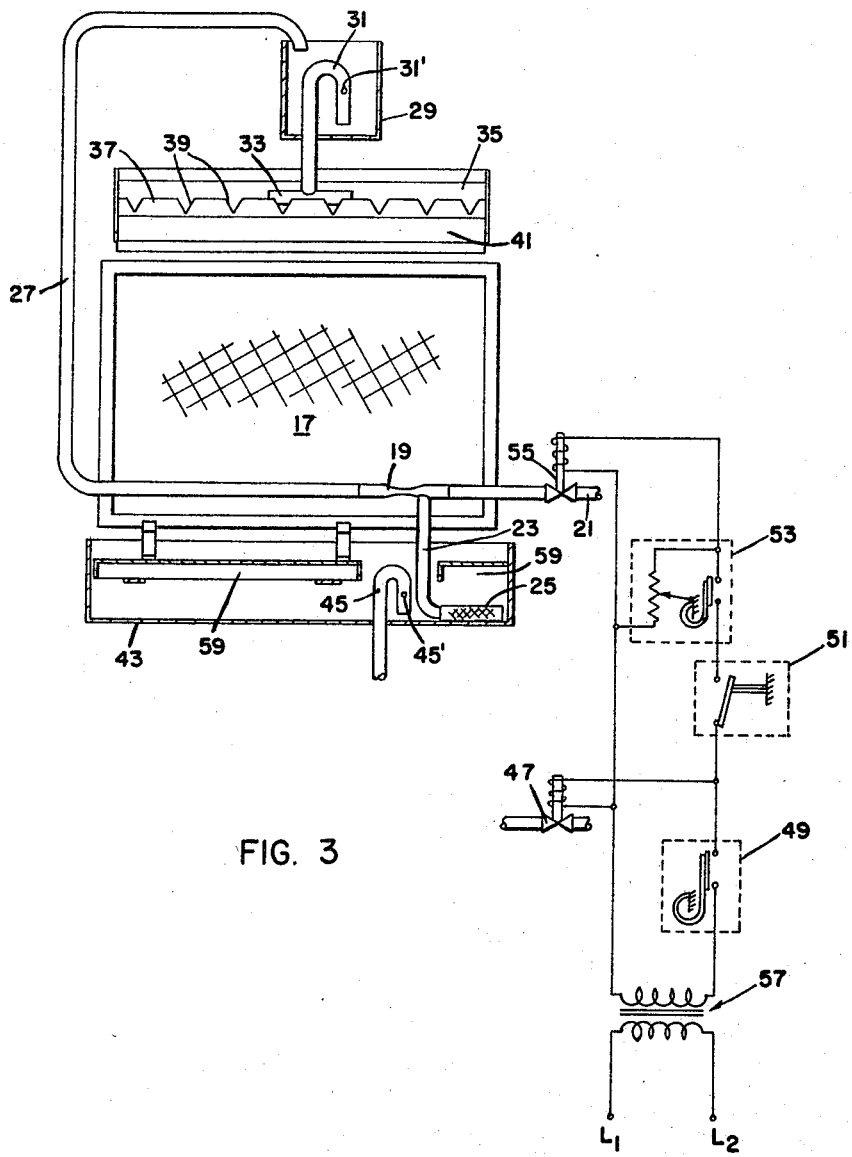
FIGURE 3 is a diagrammatic view of the humidifier embodying the invention.

Referring to the drawings, FIGURES 1 and 2 show a preferred embodiment of the invention which includes casing 11 having an inlet connection 13 and an outlet connection 15; casing 11 is adapted to be installed in combination with a furnace unit. An evaporative contact media 17, which may be any type of packing or plates, is housed within the casing 11 by suitable means so that it may be removed for replacement or cleaning.

A water ejector or jet pump 19 is provided to supply water to media 17; ejector 19 is connected to a water makeup supply line 21 and induces recirculated water through line 23 having a strainer 25 therein.

The water ejector 19 supplies the mixture of makeup water and recirculated water through a line 27 to a small reservoir tank 29. A syphon tube 31 is provided within the reservoir tank 29 and intermittently distributes water from a pipe 33 into a distribution pan 35. An aperture 31' is located above the end of the syphon tube 31 for a purpose later set forth. The pan 35 has a weir section 37 including a plurality of V-shaped notches 39. Water overflowing the V-shaped notches 39 flows down a runoff sheet 41 and is distributed over the top of the evaporative media 17, water flowing through the media in heat exchange relation with the heated air passing therethrough. The unevaporated water leaves media 17 from the bottom and collects in the sump 43.

A second syphon 45 is provided within the sump 43 for intermittent cleaning and blow-down operation. An aperture 45' is located above the end of the syphon tube 45. Apertures 31' and 45' are provided to enable the syphons to drain from the bottoms of tank 29 and sump 43 respectively thereby keeping the bottoms clear of foreign matter while maintaining desired water levels in tank 29 and sump 43 in line with the apertures, the apertures being effective to break the syphoning action.

The operation may be understood more easily by referring to FIGURE 3 wherein like numerals indicate like component parts of the embodiment shown in FIGURES 1 and 2. The control system includes a solenoid furnace gas valve 47, a thermostat 49, a humidistat 51, an interval timer 53, and a solenoid water valve 55 as shown in the schematic wiring diagram in FIGURE 3. As indicated in the drawing the line voltage $L_1$—$L_2$ is stepped down through a transformer 57 for operation of this circuit. The furnace valve 47 is in series relationship with the thermostat 49 which controls its operation. Alternatively the furnace fan circuit (not shown) may be connected in series with the thermostat 49 in lieu of the furnace valve 47. The thermostat 49 is also in series relationship with the humidistat 51, the timer 53, and water valve 55. When heating and humidification are required, the circuit will be closed in accordance with the setting of the timer 53. Timer 53 may be omitted if desired.

When water valve 55 is actuated, passage of makeup water through jet pump 19 aspirates water collected in the sump 43 through line 23, the mixture of makeup water and aspirated water being supplied through line 27 to the small reservoir tank 29 at the upper portion of the humidifier unit.

When the water in the reservoir tank 29 rises to a level which submerges the syphon tube 31, the syphon will dump the water at a very rapid rate into that area of pan 35 behind the weir section 37. The water flows through the V-shaped notches 39 and over the run-off sheet 41 (see FIGURE 2) onto the top of the evaporative surface 17. Warm air from the furnace is passed through media 17 and evaporates a portion of the water as it flows down media 17. The water that is not evaporated then drains from the bottom of the media 17 into the sump 43.

The amount of makeup water is such that it will be greater than the amount evaporated, thus the water level in the sump slowly rises until the syphon tube 45 therein is submerged. When this occurs a large portion of the water in the sump is immediately syphoned from the bottom which takes out the accumulation of any dirt particles therein. Thus, by periodically discarding some of the water, the mineral concentration in the sump is reduced and dirt particles washed off of the contacting surface are removed.

To permit the use of a larger syphon 45, an air trap is provided, this arrangement being disclosed and claimed in a copending application entitled "Syphon Apparatus," Serial No. 285,393, filed June 4, 1963, filed in the name of Donald Wellman. The air trap comprises inverted air tight compartments 59 at the upper portion of the sump 43 on each side of the syphon tube 45. Each compartment 59 acts as an air pocket together displacing enough water to insure that the enlarged syphon will act as a syphon and not simply as an overflow drain. This air trap effects a more rapid rise in the water level as required to effectively submerge the larger syphon and thereby prevents its acting as an overflow drain.

As described, the on-off flow of water to the humidifier is controlled through water solenoid valve 55. This solenoid valve is energized only when the furnace gas valve or fan is operating and it will not be energized if the humidistat does not sense the need for additional moisture in the area to be heated.

Referring to FIGURE 2, the flow of warm dry air through the humidifier will now be described. Air leaving the discharge side of the furnace enters the humidifier at the top of the casing 11 through the inlet 13 into the upper plenum chamber 61 and flows therethrough to the evaporative media 17 as indicated by the solid arrow. The air passes through the upper portion of the media 17 and then goes back through the lower portion of the media 17 into a lower plenum chamber 63 as indicated by the solid arrows. The air then leaves the humidifier and returns to the inlet side of the furnace via the outlet 15. The furnace fan is used as a motivating force to circulate the air through the humidifier and a damper, located in the humidifier discharge (not shown), controls the volume of air passing through the humidifier.

Alternatively the air path through the humidifier may be in the reverse direction as indicated on the drawing by the broken arrows and thus the inlet and outlet connection 13 and 15 respectively become reversed. As shown by FIGURE 2 in a broken line the connections may also be on the side of the unit as indicated by 13' and 15'.

The jet pump 19 and syphon tube 31 are in a series relationship which enables an instantaneous flow rate which is approximately ten times greater than the amount of makeup water furnishd and thirty to fifty times the evaporation rate, thus providing improved wetting of the evaporative media 17 which gives a higher capacity for a given area of evaporative surface and reduces scale buildup to a minimum.

The high instantaneous flow rate thus achieved by the jet pump and syphon combination eliminates dry spots on the surface where scale and dirt may build up. It is also possible to economize on the makeup water in locations where this commodity is scarce or highly expensive because of the higher instantaneous flow rates provided. If desired, interval timer 53 may be included and set to operate at longer intervals to obtain economy, yet furnish the humidification needs.

The syphon tube 45 periodically dumps at least a portion of the water for the purpose of cleaning the sump and providing a blow-down action which will prevent the concentration of minerals in the water from building up.

While I have described a preferred embodiment of the invention, various other advantages and applications will occur to those skilled in the art and it will be understood that the invention is not limited thereto since it may be otherwise embodied within the scope of the following claim.

I claim:

In a gas and liquid contact apparatus, the combination of a casing, evaporative media exposed to passage of air therethrough, distribution means to supply intermittently water to the evaporative media, said means including a reservoir tank, a syphon tube within said tank, a distribution pan having a weir section, said section including a plurality of V-shaped notches, and a run-off sheet, water overflowing the notches onto the sheet, the sheet distributing the water over the top of the evaporative media, a sump below said media, a jet pump to supply water from the sump to the distribution means, a makeup water line, said pump being connected to said makeup water line and being actuated by water supplied through said line, a second syphon tube within the sump to remove periodically a portion of the water in the sump, a valve in said line, and control means including a thermostat and a humidistat for regultaing operation of said valve.

References Cited by the Examiner

UNITED STATES PATENTS

| | | | |
|---|---|---|---|
| 354,624 | 12/1886 | Boyle | 137—134 |
| 2,235,116 | 3/1941 | Ray | 261—97 X |
| 2,319,565 | 5/1943 | Stratton | 261—29 |
| 2,327,242 | 8/1943 | Bolcom | 261—97 X |
| 2,356,757 | 8/1944 | Fleisher | 55—482 |
| 2,429,265 | 10/1947 | Fleisher | 261—97 X |
| 2,646,061 | 7/1953 | Bottum | 137—142 |
| 2,828,761 | 4/1958 | Weibert | 137—132 |
| 2,948,233 | 6/1960 | Scharfe | 261—97 |
| 3,058,726 | 10/1962 | Goettl | 261—29 |

FOREIGN PATENTS 399,109 9/1933 Great Britain.

HARRY B. THORNTON, *Primary Examiner.*

T. R. MILES, *Assistant Examiner.*